May 17, 1960

R. E. ROBERTS 2,936,812

METHOD AND APPARATUS FOR MAKING FLEXIBLE
CORRUGATED REENFORCED HOSE

Filed Sept. 3, 1957

INVENTOR.
ROBERT E. ROBERTS
BY
Bates, Teare & McBean
ATTYS.

May 17, 1960    R. E. ROBERTS    2,936,812
METHOD AND APPARATUS FOR MAKING FLEXIBLE
CORRUGATED REENFORCED HOSE
Filed Sept. 3, 1957    4 Sheets-Sheet 2

INVENTOR.
Robert E. Roberts
BY
Bates, Pears & McBean
ATTYS

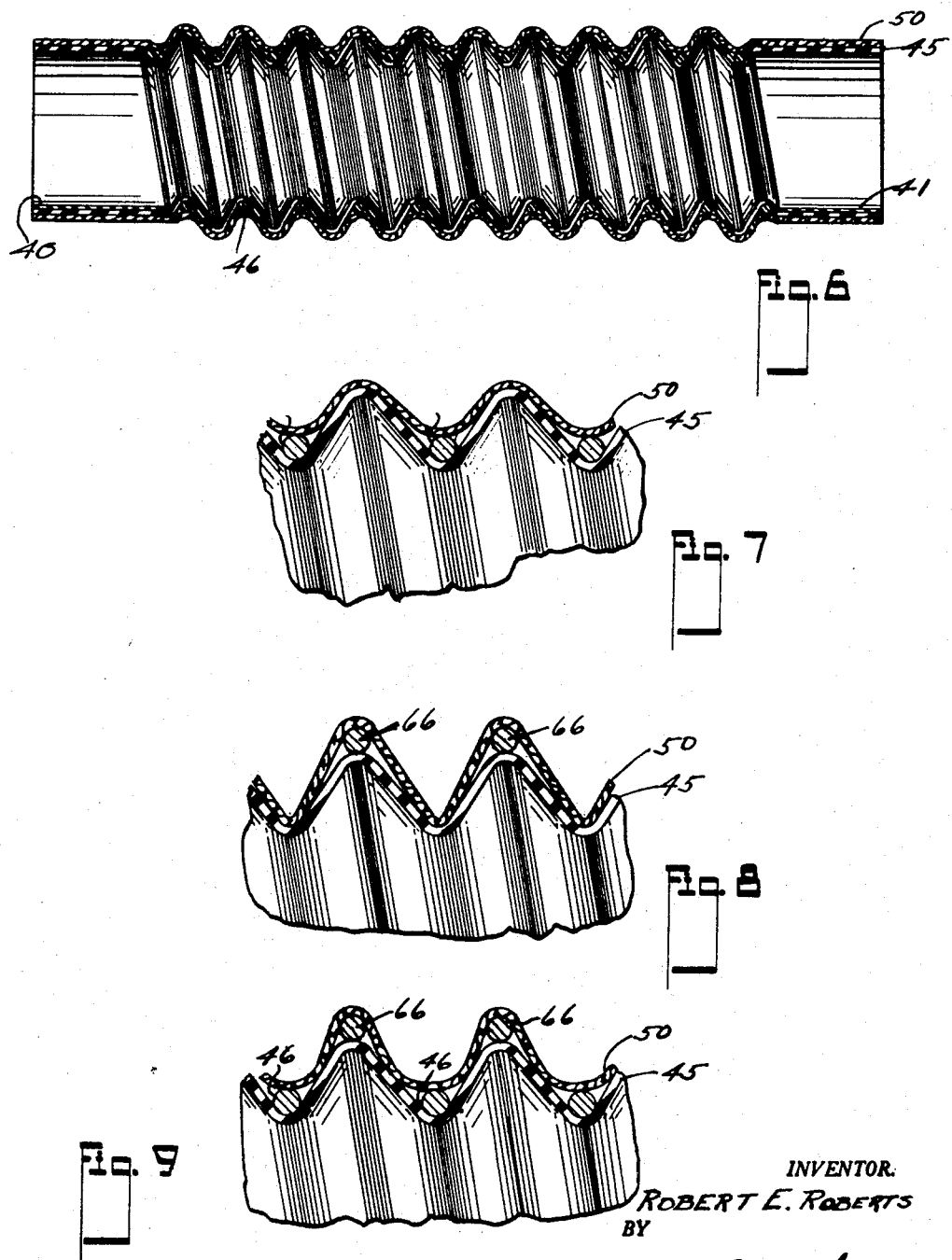

May 17, 1960  R. E. ROBERTS  2,936,812
METHOD AND APPARATUS FOR MAKING FLEXIBLE
CORRUGATED REENFORCED HOSE
Filed Sept. 3, 1957  4 Sheets-Sheet 4

INVENTOR.
ROBERT E. ROBERTS
BY
Bates, Teare, & McBean
ATTYS.

United States Patent Office 2,936,812
Patented May 17, 1960

2,936,812

METHOD AND APPARATUS FOR MAKING FLEXIBLE CORRUGATED REENFORCED HOSE

Robert E. Roberts, Wilton, Conn.

Application September 3, 1957, Serial No. 681,692

19 Claims. (Cl. 154—7)

This invention relates to corrugated reenforced flexible hose and to a method and apparatus for making the same.

This application is a continuation-in-part of my copending application Serial No. 431,320, filed May 21, 1954, now abandoned.

Sections of hose of relatively short lengths used as conduits for the cooling system of internal combustion engines must be capable of resisting collapse on the suction end of the cooling system and of resisting swelling and bursting on the pressure end of the system.

An object of the present invention is to provide a corrugated flexible hose, together with a method and apparatus for making same, which will be more economical to make, and yet will possess the strength required for resistance against collapsing on either the suction or pressure ends of a cooling system.

An additional object is to provide a method and apparatus by means of which the hose may be set into final form, without incurring defects which have heretofore been attendant upon the formation of hollow blown rubber articles, which are not properly and accurately formed before being placed in the molds. In this connection my invention contemplates a method and apparatus by means of which the formed hose will have the correct size, shape and contour for insertion into a mold for setting into final form. Additionally, however, the invention contemplates a hose construction as well as a method and apparatus for forming the same by means of which the formed hose can, if desired, be cured or set without molds or mandrels, as, for example, in an open cooling means or a steam curing apparatus.

The invention contemplates a flexible corrugated reenforced hose having inner and outer corrugated envelopes, with reenforcing means therebetween, which are set in final form after formation. The invention includes the use of reenforcement, which may be metallic or non-metallic, and which may be positioned either in the crests or troughs, or in both, of the corrugations. The metallic reenforcements may comprise spaced turns of previously formed wire, and the method, when the setting takes place in a mold, includes the step of forcing the hose against the mold cavities by the use of internal pressure during the setting operation. The apparatus includes an inflatable body supported by a rigid form, together with means for inflating the body against the wall of the hose to corrugate it, and hold it in corrugated condition, while completing the wall with reenforcement after which the corrugated hose may be removed from the inflatable body and set in final form.

Referring now to the drawings,

Fig. 6 is a longitudinal section through a hose formed on the mandrel and ready to be set in final form.

Fig. 7 is a fragmentary sectional view of the hose shown in Fig. 6 but on a scale larger than that shown in Fig. 6.

Fig. 8 is a fragmentary sectional view similar to Fig. 7 but showing a modified form of hose construction.

Fig. 9 is a fragmentary sectional view similar to Fig. 7 but showing a further modified form of hose construction.

Figure 1:
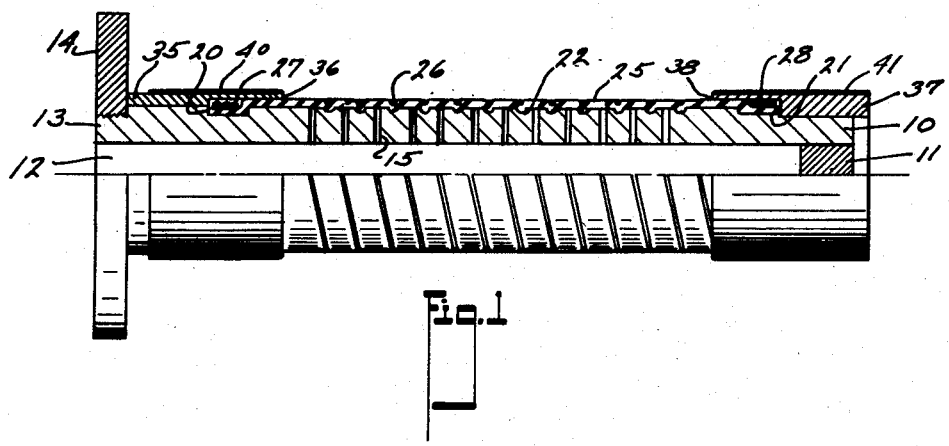
Figure 1 is a side view partly in section of an inflatable body mounted upon a mandrel and used for carrying out the method of the present invention.

Referring to Fig. 1, 10 indicates a hollow rigid mandrel which is closed at one end, as at 11, and is open at the other end, and is provided with an axially disposed passageway 12 into which air under pressure may be introduced at the end 13. The mandrel is shown as having a flange 14 adjacent the end 13 for permitting suitable attachment to the rotating head of a machine. The mandrel is also provided with radially extending passageways 15, at regularly spaced intervals, which extend from the passageway 12 to the outer surface of the mandrel. The mandrel may also be provided with a peripheral groove 20 adjacent one end thereof and with a corresponding recess 21 at the opposite end. Additionally, the mandrel may also have a spiral groove 22 extending along the outer surface thereof and positioned intermediate the radial passageways 15.

Figure 2:
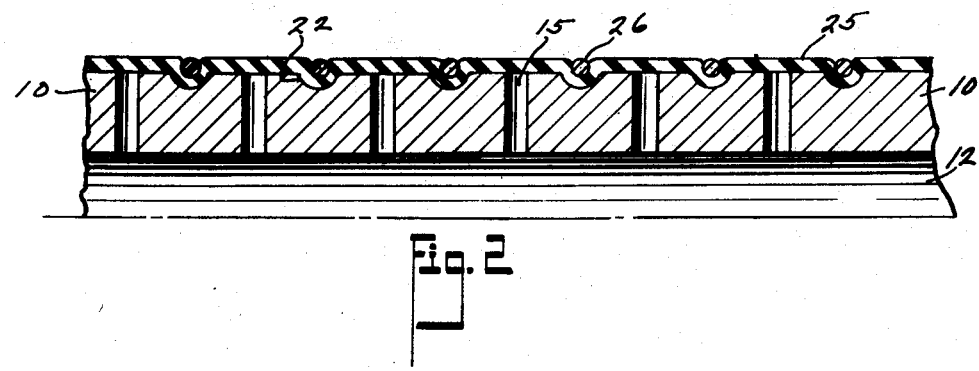
Fig. 2 is a longitudinal section of a portion of the mandrel and inflatable body shown in Fig. 1 on a scale larger than that shown in Fig. 1.
Figure 3:
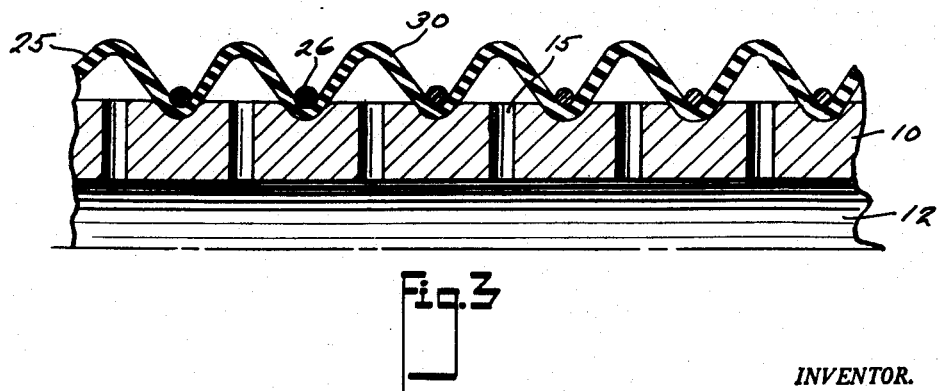
Fig. 3 is a section similar to Fig. 2 but showing the mandrel unit in inflated condition.

The mandrel is enclosed by a cover in the form of a sleeve or envelope 25, which may be made of fluid impervious material such as cured rubber, and may be attached to the mandrel by turns of wire 26, one end 27 of which binds the sleeve or covering to the groove 20 while the other end 28 binds the sleeve to the mandrel in the groove 21. The turns 26 are in registration with the spiral groove 22 in the mandrel as is shown in Fig. 2. The portions of the envelope intermediate the turns are capable of being distended to corrugated form, as shown at 30 in Fig. 3, whenever air under pressure is introduced into the passageway 13. The corrugations serve to form the layers of hose material into corrugated formation and to hold them in such formation pending the completion of the hose building process.

To cover the ends of the sleeve 25, I provide a rigid sleeve or collar 35 which may fit tightly against the mandrel at one end thereof, and may have an extension 36 which extends across the turns 27 and bears against the covering material 25. At the opposite end of the mandrel I provide a similar collar 37 which, however, is slidably mounted on the end of the mandrel but which also has an extension 38 which projects across the turns 28. The removability of this collar facilitates the removal of the hose at the completion of the forming operation.

Figure 4:
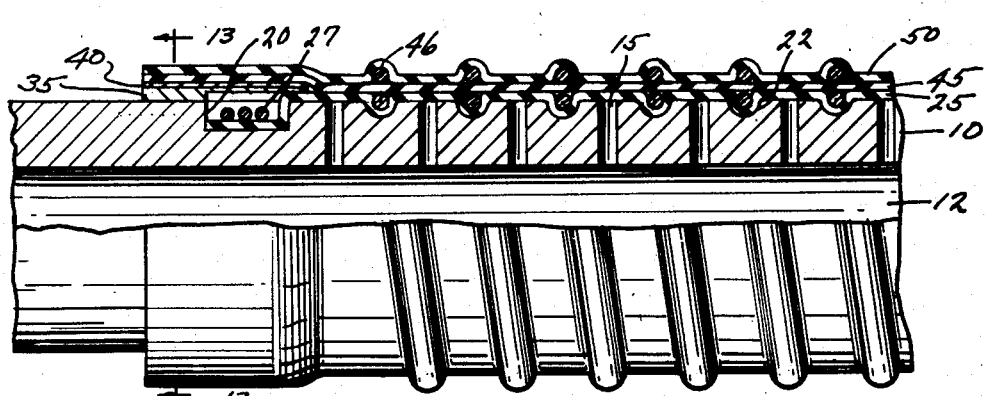
Fig. 4 illustrates a step in the formation of a hose upon the unit of Fig. 1.

The initial step in forming a hose by the method of the present invention is to place a relatively thin metallic insert in the form of a sleeve or shim 40 over the collar 35 and a similar insert in the form of a sleeve 41 over the collar 37, after which the tube, or envelope, which forms the inner wall of the hose, indicated at 45 in Fig. 4, is placed over the mandrel, while the covering 25 is in deflated condition. The envelope 45 may consist of elastomeric material (such as rubber—natural or synthetic—or thermoplastic resins which may be molded under heat and pressure, for example, polyethylene, polyamides, vinyl polymers, copolymers and the like, the particular requirement of the hose determining the composition thereof) which extends over the collars 35 and 37. Following this a preformed coil of wire having turns 46 is extended and placed over the envelope 45, with the turns thereof in registration with the turns 26 on the mandrel, whereupon the end turns are fastened to the envelope. The turns 46 constitute the reenforcement for the hose and are covered preferably by an outer envelope 50 which is tubular in form and may consist of elastomeric material, or rubberized fabric, such as stockinette, which is cemented to the envelope 45. The foregoing hose assembly is illustrative of a two-layer unit wherein the outer envelope is pressed firmly into engagement with the inner envelope.

Figure 5:
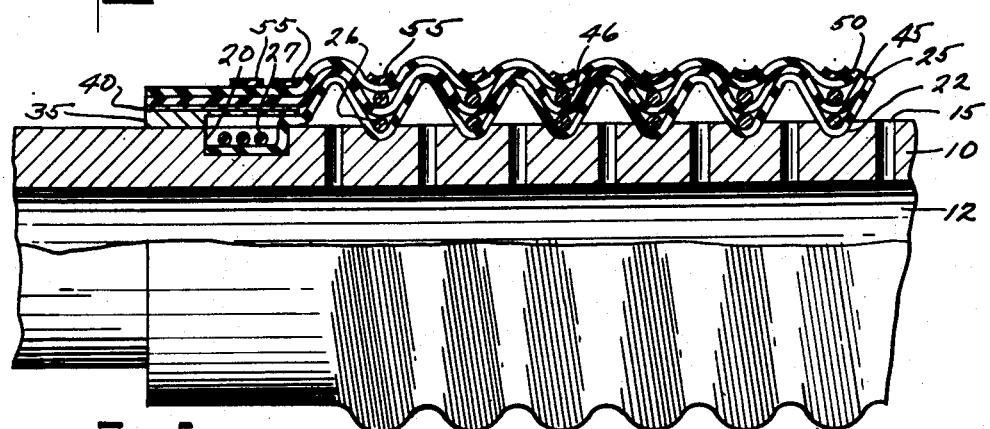
Fig. 5 shows another step in the formation of the hose.
Figure 13:
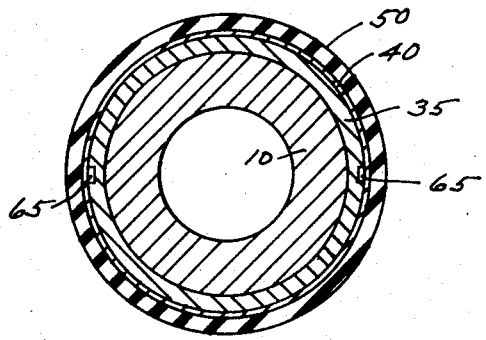
Fig. 13 is a section taken on a plane indicated by the line 13—13 of Fig. 4.

The next step in carrying out my process includes the introduction of air, under pressure, into the axial passageway 12 and sufficient in amount to extend the intermediate portions 30 of the mandrel cover by the flow of air through the passageways 15, thus resulting in a corrugated formation of the hose material, as is shown, for example, in Fig. 5. Thereupon, the inner and outer envelopes may be firmly drawn together by means of a stretchable strip 55, which is pulled tightly against the troughs of the corrugation while air, under pressure, is maintained within the mandrel. After the unit has stood for a sufficient length of time to effect adherence between the envelopes, the air pressure within the mandrel is removed, and, if necessary, a vacuum may be applied to retract the covering material 25 and hold it firmly against the surface of the mandrel while leaving the formed hose in corrugated formation upon the mandrel. Thereupon, the forming strip 55 may be removed and the hose, together with the end inserts 40 and 41 may be withdrawn upon removal of the collars 35 and 37. To facilitate removal of the hose from the mandrel, I have shown, in Fig. 13, the use of air vents 65 which extend axially of the collars 35 and 37 and which serve to facilitate collapsing of the mandrel cover 25 at the completion of the forming operation.

A hose formed in accordance with the foregoing method is shown in Fig. 6 as having the corrugations and reenforcement accurately spaced with relation to each other so that the hose is in satisfactory condition to be set in final form by vulcanization or by cooling as determined by the elastomeric material used. The retention of the inserts 40 and 41 in the ends of the hose assists in holding the ends in proper formation to permit handling and to assure smooth cylindrical surfaces at the completion of the setting operation by pressure molding the end portions between the inserts and the mold surface.

Figure 12:
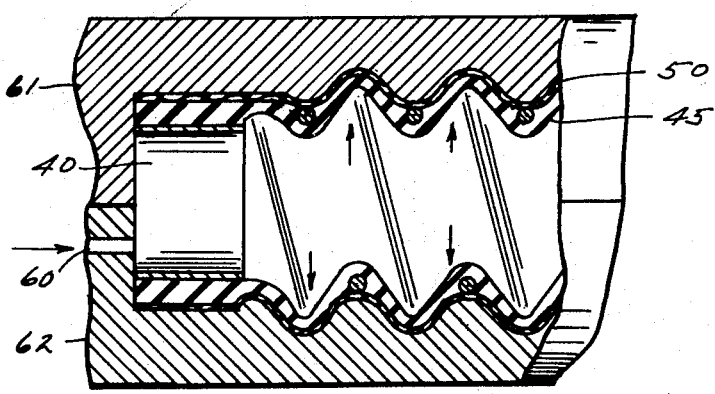
Fig. 12 is a fragmentary view, partly in section, of a sectional mold and illustrating a forming operation during setting.

In Fig. 12, I have shown a fragmentary view of two sectional molds 61 and 62 into which the hose may be placed for molding and setting, and I have indicated at 60 an inlet for the introduction of air under pressure by means of which the hose may be pressed against the cavities of the molds during setting of the material in molded shape. It is to be understood that the cavities of the molds are shaped to produce the desired hose formation, that illustrated in Fig. 12, being illustrative of the hose shown in Fig. 6.

At the completion of the setting operation, the hose is removed from the mold and the inserts 40 and 41 are removed from the hose. The resulting product constitutes a flexible corrugated hose which is economical to make and which has sufficient strength to resist collapsing and bursting when used in the cooling system of an automobile engine. The inner envelope may be made of any compound which is adequate to resist the action of antifreeze liquids which might otherwise quickly destroy some compounds of rubber and plastic material. The reenforcement is embedded within the hose between the inner and outer envelopes and is held in fixed position by the setting of the material of which the hose is made.

Figures 10, 11:
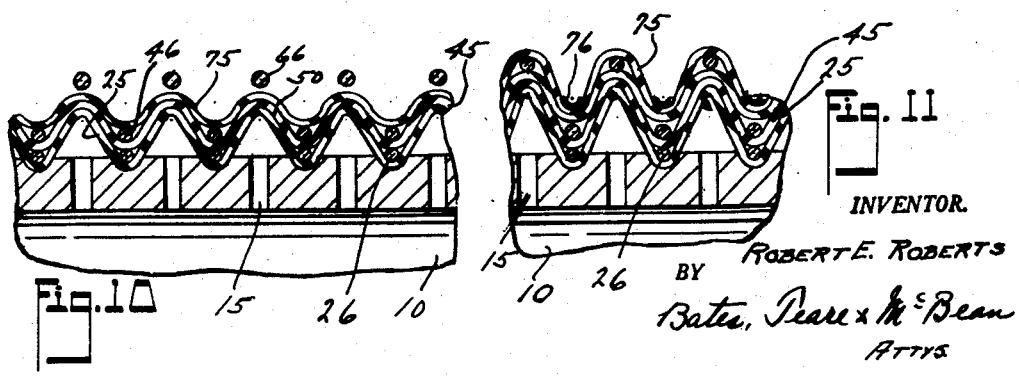
Fig. 10 is a fragmentary sectional view through the forming mandrel and illustrating a step in the formation of a hose which is intended to have reenforcements in the crests of the hose corrugations.
Fig. 11 is a sectional view similar to Fig. 10 but showing a further step in the formation of the hose of Fig. 11.

A modification of my invention is shown in Fig. 8, wherein the reenforcement turns 66 are embedded within the crests of the corrugations instead of in the troughs. This is accomplished, as shown in Fig. 10, by holding the turns 66 above the partially inflated form and then further inflating it until the corrugations bear against the turns. Thereafter, the outer envelope 50 is applied and the troughs are pulled down by the use of a resilient strip, such as is shown at 55 in Fig. 5, and held until the cement between the envelopes is sufficiently adherent to hold the envelopes together during the handling of the hose between the forming and setting operations.

A further modification of the invention is shown in Fig. 9 wherein reenforcement turns 46 and 66 occur in the crests and troughs respectively of the corrugations.

Fig. 10 shows the use of a hose of the type shown in Fig. 7 with additional steps used in the formation of a three-layer hose wherein the mandrel cover is partially inflated, after which the coil 66 is applied and held, during further inflation, and is enclosed by the third envelope 75. In Fig. 11, a resilient strip 76 is shown as utilizable for pulling the envelopes tightly together and holding them until the intervening adhesive sets sufficiently to enable the material to retain its corrugated formation. Thereafter, the strip 76 is removed, the mandrel cover is deflated, and the formed hose is removed and set in final form.

While I have referred to the reenforcement as turns of a wire spring, I may, if desired, use a reenforce of cord, treated with adhesive, to cause it to adhere to the body of the hose and form, when finished, a suitable reenforcement either in the troughs, or crests, or both, of the corrugations. Moreover, if desired, the turns in the troughs may comprise wire turns, whereas the turns in the crests may comprise non-metallic reenforcement turns.

While I have shown the reenforcement turns as being applied directly against the inner envelope, I may, if desired, apply cement to the outer surface of the inner envelope and then pull a stockinette tube over it, apply cement to the stockinette tube, and then apply the reenforcement over the stockinette. Thereafter I may cover the reenforcement turns either with a complete tubular envelope, or with a narrow elastomeric band over the respective turns, thus providing a tube which has a stockinette reenforce under the turns. This would result in a hose having in effect two layers under the reenforcement turns, and one layer of covering material over the reenforcement turns. Thereupon, the entire unit would be removed from the mandrel and set, as previously described.

A hose made in accordance with the foregoing method and apparatus has great flexibility and strength to resist collapsing and bursting, and at the same time is capable of being economically made by a setting operation. When setting in a mold, the method enables the reenforcement to be accurately positioned and the corrugations to be properly formed to fit into the mold cavities, thus resulting in an improved hose with greatly reduced cost of manufacture, yet with retention of accuracy in the formation of the hose and in smoothness of the walls.

I claim:

1. A method of making a flexible corrugated reenforced hose comprising, taking a tubular mandrel having an axially extending passageway for air therein, and having passageways extending radially from the axial passageway to the surface of the mandrel, and having a covering tube of flexible material fastened thereto at spaced intervals forming fastened portions intermediate the radially extending passageways, enveloping the mandrel with an envelope of vulcanizable material, superimposing reenforcement turns over the envelope, covering the reenforcement turns with vulcanizable material, introducing air under pressure into the mandrel to inflate the covering and thereby to expand the envelope between said fastened portions of the covering to corrugated formation having crests and troughs, removing the air pressure from the mandrel, removing the hose from the mandrel and then vulcanizing it.

2. A method according to claim 1 wherein the reenforcement turns are obtained by positioning a spiral coil of wire spirally around the envelope.

3. A method according to claim 1 wherein the reenforcement turns are placed on the envelope only in such region that they occur in the troughs of the corrugations.

4. A method according to claim 1 wherein the reenforcement turns are placed only in the crests of the corrugations.

5. A method according to claim 1 wherein the reenforcement turns are placed over the first envelope in such region as to lie in the troughs of the corrugations, and wherein a second set of reenforcement turns is applied to the crests of the corrugations.

6. A method according to claim 5 wherein the air pressure is further increased after the second layer of reenforcement has been applied so as to force the corrugation against the reenforcement in the crests of the corrugations.

7. A method according to claim 1 wherein a rigid sleeve is placed over the mandrel covering at each end thereof and is covered by the hose but is removed therefrom after the completion of the vulcanizing operation.

8. An apparatus for making corrugated flexible hose comprising a mandrel having a flexible envelope of fluid impervious material fastened thereto at spaced intervals, the mandrel having passageways therein whereby air under pressure may be introduced through the mandrel against the envelope to expand it in the regions between said spaced intervals to corrugate the envelope.

9. Apparatus for making corrugated flexible hose comprising a hollow tubular mandrel having an axially extending air passageway therein, one end of the mandrel being open and the other end being sealed, the wall of the mandrel having spaced passageways extending radially from the axial passageway to the exterior surface thereof, and the surface of the mandrel having grooves therein extending circumferentially thereof, and located between the radially extending passageways, a cover comprising a flexible sheet extending around the mandrel and for substantially the full length thereof, means for fastening the ends of the cover to the mandrel, and means engaging the cover and pressing spaced portions thereof into said grooves to secure the cover thereto between said radial passageways.

10. A pneumatic mandrel of the character described comprising a cylindrical body having an axially extending passageway therein, and having spaced passageways extending radially from the axial passageway to the outer surface of the mandrel, said body having a peripherally extending groove adjacent each end thereof and having a spiral groove intermediate the end grooves and out of registration with the radially extending passageways, a tube of radially expansible fluid impervious material in close-fitting engagement with the mandrel and extending between the end grooves, means for fastening the ends of the tube into the end grooves and a binding of wire engaging the tube and forcing portions thereof into the spiral groove.

11. A mandrel according to claim 9 wherein a collar is positioned on each end of the mandrel, each collar having a portion thereof overlapping the cover and extending beyond the end groove adjacent thereto.

12. A mandrel according to claim 11 wherein one of said collars is fixed to the mandrel and the other is slidable axially upon the mandrel.

13. A mandrel according to claim 9 wherein the axial passageway is open at one end and closed at the other, and wherein one end of the mandrel is provided with means for attaching it to a rotating member.

14. A method of making a flexible spirally corrugated reenforced hose comprising forming a hose wall of vulcanizable material with spiral reenforcement turns disposed therein and having an intermediate corrugated wall portion and non-corrugated end portions, placing said formed hose wall in a mold having a mold cavity provided with an internal wall shaped complementary to the formed hose, vulcanizing the formed hose while maintaining fluid pressure within and directly against the hose wall to press the intermediate portion of the hose against the wall of the mold cavity and while protecting the end portions of the hose from the action of such fluid pressure.

15. A method of making a flexible corrugated hose comprising forming a hose wall having internal reenforcements of steel wire into a corrugated form having reenforced uncorrugated end portions and a reenforced corrugated intermediate portion from a tube including an inner layer of pliable vulcanizable material having overlying turns of steel wire reenforcement covered by a second layer of vulcanizable material, involving forming corrugations in an intermediate portion of the tube wall and shaping the wall about the reenforcement while supporting the tube on a flexible fluid impervious spirally corrugated core and introducing fluid pressure into the core, releasing the pressure and removing the formed tube from the core, placing the formed tube in a mold having a mold cavity provided with an inner wall substantially complementary to the formed tube, vulcanizing the tube by pressing it against the mold cavity wall while applying pneumatic pressure to the interior of the tube.

16. A method for the manufacture of reenforced spirally corrugated hose which comprises forming a tubular member of elastomeric material, positioning thereover a reenforcing member having axially spaced turns, positioning said tubular layer with said reenforcing member thereon within a hollow internally corrugated mold with said turns in alignment with and positioned within said corrugations, and subjecing said tubular member to internal pressure accompanied by heating to cause it to expand and soften and conform to the shape of said mold while simultaneously flowing around and embedding said turns therein.

17. A method according to claim 16 wherein the tubular layer is composed of thermoplastic elastomeric material which is allowed to set by cooling after said turns have become embedded therein.

18. A method according to claim 16 wherein the reenforcing member is a helical coil having spaced turns.

19. A method according to claim 16 wherein the reenforcing member is covered with elastomeric material prior to embedding it in said layer.

References Cited in the file of this patent

UNITED STATES PATENTS

| | | |
|---|---|---|
| 2,248,898 | Ross et al. | July 8, 1941 |
| 2,272,704 | Harding | Feb. 10, 1942 |
| 2,314,611 | Dreyer | Mar. 23, 1943 |
| 2,446,281 | Harding | Aug. 3, 1948 |
| 2,486,763 | Roberts | Nov. 1, 1949 |
| 2,490,513 | Dreyer | Dec. 6, 1949 |
| 2,524,679 | Roberts | Oct. 3, 1950 |
| 2,713,885 | McKinley | July 26, 1955 |
| 2,723,426 | Pelley | Nov. 15, 1955 |
| 2,779,976 | Roberts et al. | Feb. 5, 1957 |
| 2,797,730 | Martin | July 2, 1957 |
| 2,837,121 | Roberts | June 3, 1958 |

FOREIGN PATENTS

| | | |
|---|---|---|
| 651,097 | Great Britain | Mar. 14, 1951 |